United States Patent [19]
Martinez et al.

[11] Patent Number: 5,245,635
[45] Date of Patent: Sep. 14, 1993

[54] CLOCK RECOVERY CIRCUIT FOR MANCHESTER ENCODED DATA

[75] Inventors: Daniel L. Martinez, Glendale; Roger D. Stanley, Phoenix, both of Ariz.

[73] Assignee: Honeywell Inc., Minneapolis, Minn.

[21] Appl. No.: 802,154

[22] Filed: Dec. 4, 1991

[51] Int. Cl.$^5$ .................................................. H04L 7/02
[52] U.S. Cl. ................................ 375/110; 375/118; 328/63; 328/139; 307/269
[58] Field of Search ............... 375/110, 87, 118; 360/38.1, 51; 328/63, 119, 139; 307/269; 341/70

[56] References Cited

U.S. PATENT DOCUMENTS

| | | | |
|---|---|---|---|
| 4,542,420 | 9/1985 | Kozlik et al. | 375/110 X |
| 4,592,072 | 5/1986 | Stewart | 375/110 X |
| 4,688,232 | 8/1987 | Fox | 375/87 |
| 5,046,073 | 9/1991 | Sexton | 375/110 X |

*Primary Examiner*—Curtis Kuntz
*Assistant Examiner*—Tesfaldet Bocure
*Attorney, Agent, or Firm*—A. A. Sapelli; W. Udseth; A. Medved

[57] ABSTRACT

An input data stream (a manchester encoded data stream which includes a clock signal component and has some jitter) is inputted to a clock extractor for extracting the clock signal component, the clock signal component having missing clock pulses. A delay line oscillator provides the missing clock pulses and outputs a recovered clock signal. The recovered clock signal has a first delay time as a result of inherent delays in the delay line oscillator and the clock extractor. A latch element receives the recovered clock signal and the input data stream, the input data stream being delayed a second delay time, the first delay time and the second delay time being essentially the same. The latch element reclocks the input data stream thereby removing a maximum amount of jitter and removes any distortion of the input data stream.

5 Claims, 3 Drawing Sheets

CLOCK RECOVERY CIRCUIT FOR MANCHESTER ENCODED DATA

BACKGROUND OF THE INVENTION

The present invention relates to a digital circuit, and more particularly, to a jitter reduction and clock recovery circuit for a manchester encoded input data stream to reduce the jitter between the recovered clock signal and the inputted manchester encoded data stream.

Manchester encoded data streams (or signals) are extensively used in the transmission of digital data. An advantage of this type of encoding is its self-clocking feature, as well as its ability to increase the integrity of the data transmitted by minimizing noise interference, minimizing loss of synchronization, and minimizing undetected transmission errors. However, signal distortion and signal jitter can impair the integrity and quality of the data contained in the manchester encoded data stream, especially when the data stream is transmitted over long distances.

The circuit of the present invention can be utilized as a repeater, i.e., eliminate the jitter and signal distortion and retransmit the manchester encoded data stream onto a transmission line (or bus). The circuit of the present invention can also be used in a system which, after the recovery of the clock signal from the manchester encoded data stream, the data stream can be provided to a decoder for extracting the data contained in the data stream for processing or use by the system.

SUMMARY OF THE INVENTION

Therefore, there is provided by the present invention, a clock recovery circuit which is utilized to essentially eliminate any jitter of a manchester encoded data stream.

The apparatus of the present invention significantly reduces jitter of an input data stream. The input data stream is a manchester encoded data stream which includes a data signal component and a clock signal component. The apparatus comprises a clock extractor which has an input terminal adapted to receive the input data stream. The clock extractor extracts the clock signal component from the input data stream, the extracted clock signal component having missing clock pulses. A delay line oscillator receives the clock signal component and provides the missing clock pulses to the clock signal component extracted from the input data stream. As a result, a recovered clock signal is generated, the recovered clock signal being delayed a first predetermined time as a result of inherent delays in the delay line oscillator and the clock extractor. A latch element includes a first and second input terminal adapted to receive the input data stream and the recovered clock signal, respectively. The input data stream coupled to the first input terminal of the latch element is delayed a second predetermined time, the first and second predetermined time being substantially equal. The latch element reclocks the input data stream, thereby removing a maximum amount of jitter in the input data stream and removes a significant amount of distortion of the input data stream.

Accordingly, it is an object of the present invention to provide a circuit which essentially eliminates any jitter found in a manchester encoded data stream.

It is another object of the present invention to extract a clock signal embedded in the manchester encoded data stream.

It is still another object of the present invention to essentially eliminate distortion of an inputted manchester encoded data stream.

These and other objects of the present invention will become more apparent when taken in conjunction with the following description and attached drawings, wherein like characters indicate like parts, and which drawings form a part of the present application.

DETAILED DESCRIPTION

Figure 1:
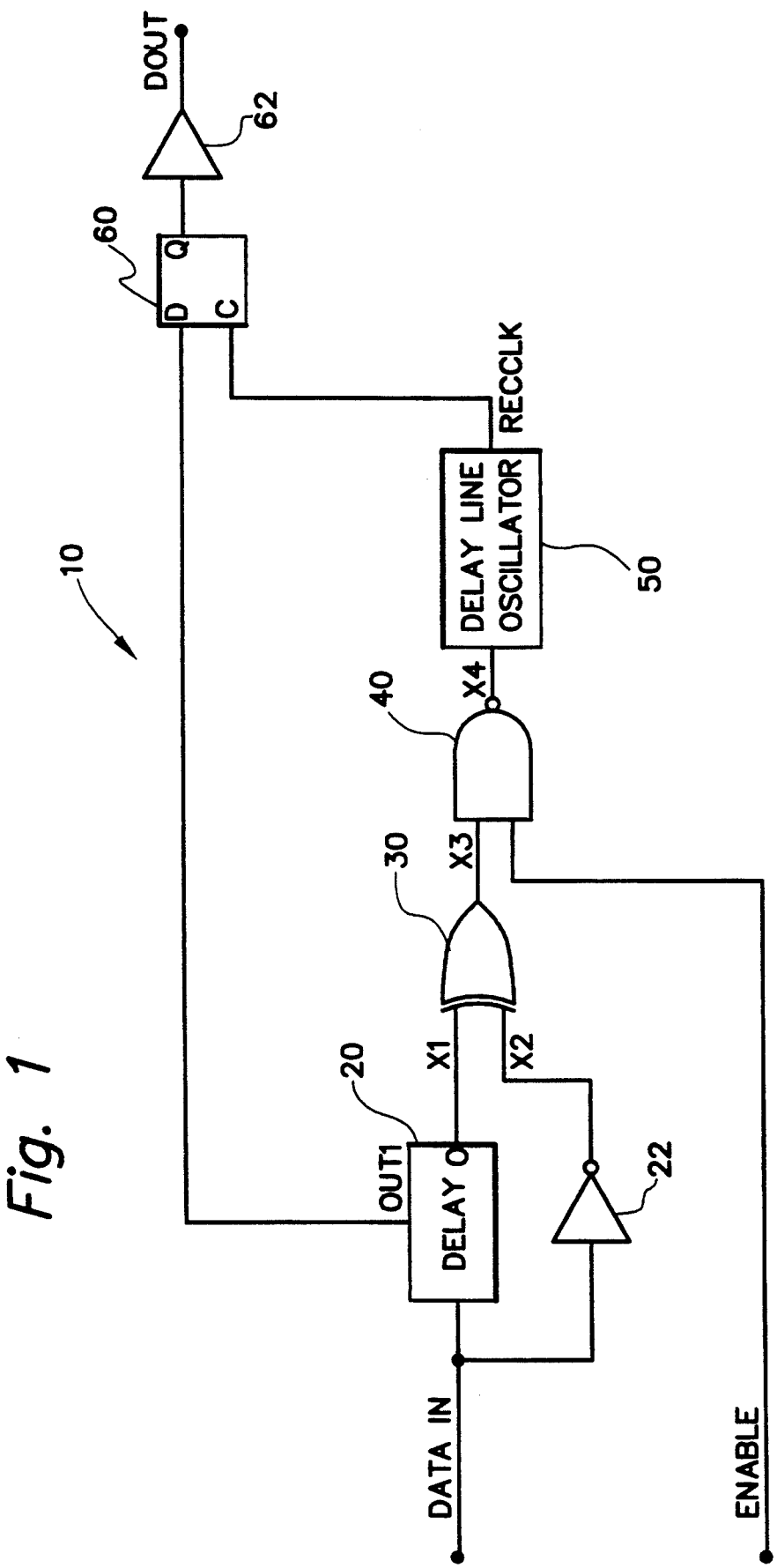
FIG. 1 shows a logic diagram of the circuit of the preferred embodiment of the present invention.

Referring to FIG. 1, there is shown a logic diagram of the circuit 10 of the preferred embodiment of the present invention. The circuit 10 utilizes a recovered clock signal RECCLK from an inputted manchester encoded data signal (DATA IN) to "reclock" the inputted manchester encoded data signal in a latch 60 thereby removing jitter present in the input data signal and "squaring up" the inputted signal eliminating any distortion present, prior to retransmission (or decoding) of the inputted signal.

Figure 2:
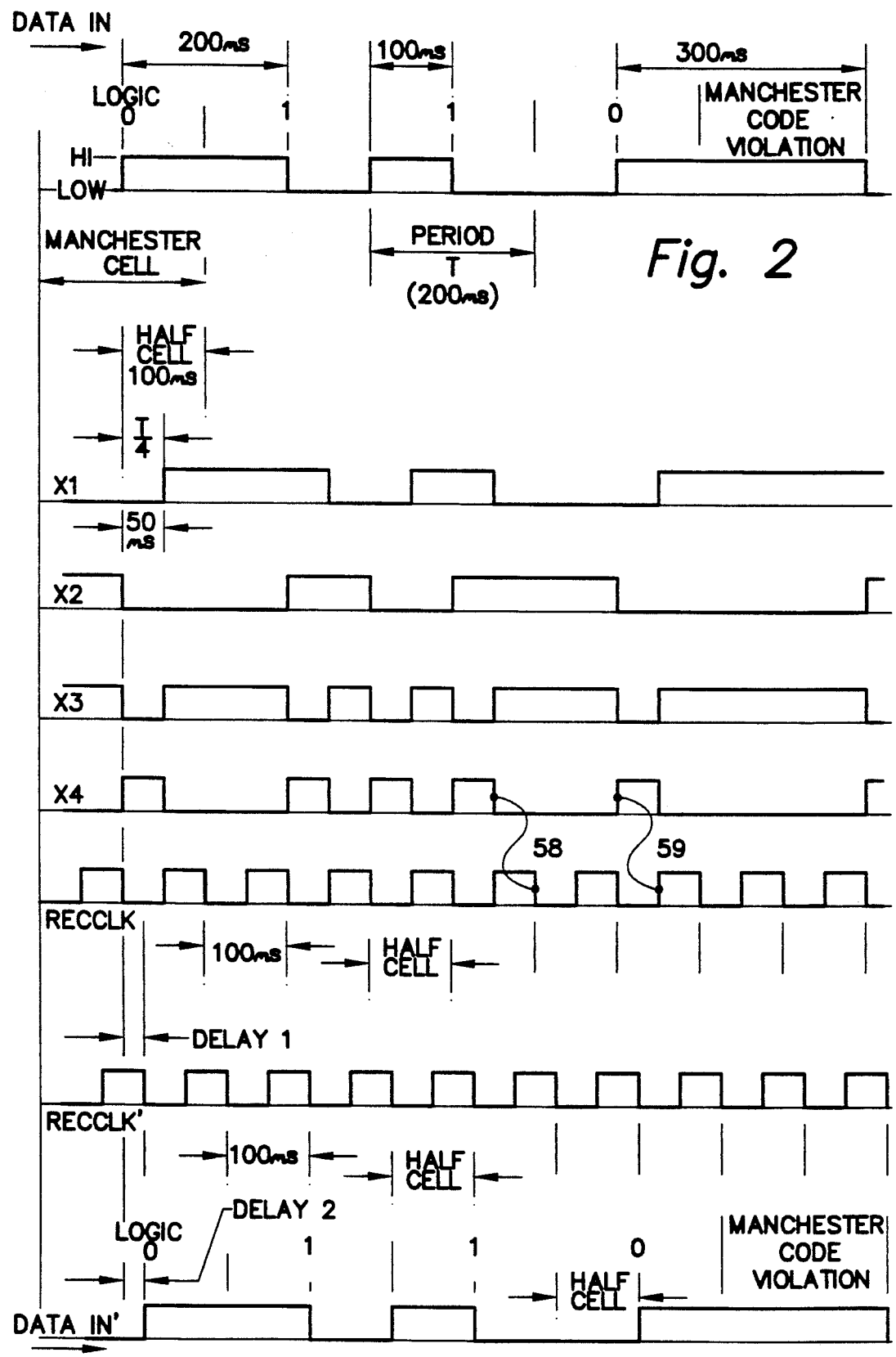
FIG. 2 shows a timing diagram of the circuit of FIG. 1.

FIG. 2 shows a timing diagram of the circuit 10 of FIG. 1. The operation of the circuit 10 will now be described, referring to both FIGS. 1 and 2. A manchester encoded data signal (or manchester encoded data stream), DATA IN (input data), is inputted to a tapped delay element 20. In the preferred embodiment of the present invention, the input data has a period T of 200 ns, denoted as a manchester cell of 200 ns. The input signal, DATA IN, is shown in FIG. 2 containing a logic 0, followed by a logic 1, a logic 1, a logic 0, and a manchester code violation. A transition from a high-to-low or a low-to-high level must occur in the middle of the manchester cell (or more simply cell) in order to be valid. Positive going transitions correspond to a logic zero value, and negative going transitions correspond to a logic 1 value. In the preferred embodiment of the present invention, the data rate is 5 mega bit/second, or a period T of 200 ns. Therefore, it can be seen that the input data stream can consist of 100 ns pulses, 200 ns pulses and 300 ns pulses where manchester code violations are used as non-data symbols. The remainder of the description of the circuit 10 will utilize the 5 mega bit/second rate for example purposes only, and it will be recognized by those skilled in the art that a variety of data rates can be utilized within the scope of the invention. Thus, a half cell in the preferred embodiment of the present invention is 100 ns. The tapped delay element 20 has an output O which is 100% of the delay of the tapped delay element 20, which is one-half of the half cell, namely, 50 ns. The output signal of the delay element 20 is therefore the input data signal delayed T/4, and is inputted to an exclusive OR gate (XOR gate) 30, denoted as signal X1 in FIG. 2. In the preferred embodiment of the present invention, the input data (DATA IN) is inverted by an invertor 22. The output signal of the invertor 22 is therefore the input data signal inverted and is inputted to the XOR gate 30, denoted as signal X2 in FIG. 2.

The result of exclusive ORing the X1 and X2 signals, i.e., the input data delayed by T/4 and the input data signal (inverted in the preferred embodiment of the present invention, but not required as is readily apparent to one skilled in the art), respectively, is the output signal X3 as shown in FIG. 2.

The preferred embodiment of the present invention includes a NAND gate 40, one input being the X3 signal, and a second input being a control signal, i.e., an enable signal (ENABLE). For purposes of description herein, it is assumed that the enable signal remains high, i.e., a logic one such that the NAND gate 40 is always enabled. It will be recognized by those skilled in the art that a logic zero enable signal will disable the NAND gate 40 thereby disabling the circuit 10. Further, it will be recognized that the NAND gate 40 can be eliminated altogether (along with inverter 22) permitting the circuit 10 to operate in a normal manner, but removing the enable/disable feature, or alternatively, can be interposed at various places in the circuit 10.

The X3 signal essentially contains some of the clock pulse which the circuit 10 is trying to extract. However, during the period of 200 ns and 300 ns pulses of the data stream there are no transitions in the input data such that no clock signal can be extracted. During the periods where no clock pulses are present in the X3 signal, a delay line oscillator 50 is used to fill in the "missing" clock pulses.

The output signal of NAND gate 40 is the X4 signal, which is essentially the X3 signal inverted as shown in FIG. 2. The periods where clock pulses are missing need to be at a low level of the X4 signal in order to interface properly with the delay line oscillator 50 of the preferred embodiment of the present invention. This low level allows the delay line oscillator 50 to oscillate thereby providing the "missing" clock pulses. The X4 signal provides the correct phasing of the output of XOR gate 30 to interface properly with the delay line oscillator 50. The delay line oscillator 50 has a period of oscillation that matches the period of the minimum pulse width of the input data stream. Thus, in this example, the period of oscillation of the delay line oscillator 50 is 100 ns, or a frequency of 10 mhz. At the output of the delay line oscillator 50 is the recovered clock signal (RECCLK), as shown in FIG. 2. The rising edge of the RECCLK signal is in the middle of the half cell of the input data signal, DATAIN, which is the desired result in order to minimize the effects of jitter of the input signal, and to optimize the reshaping and decoding of the input signal. Further, it will be recognized by those skilled in the art that the required input signal X4 to the delay line oscillator 50 can be achieved in a number of ways with and without an enable/disable feature in the circuit 10.

Thus far, the signals discussed relative to FIG. 2 have been ideal signals with no gate delay or switching delay considerations. Delays in the recovered clock signal RECCLK are caused by delays through invertor 22, XOR gate 30, NAND gate 40, the tapped delay element 20, and the delay line oscillator 50. Delays of 1-6 ns can result from each element. RECCLK' shown in FIG. 2 is a realistic (rather than an ideal) recovered clock signal having a delay, DELAY 1, which can be approximately 20 ns. RECCLK' is therefore the actual output of the delay line oscillator 50. In order to minimize the effects of jitter of the input signal, the input data signal is delayed an amount DELAY 2, which is approximately the same delay time as DELAY 1, i.e., 20 ns. Therefore, the output of the tapped delay element 20, OUT 1, is the 40% tap, 40% of 50 ns being 20 ns. Therefore, the output signal from OUT 1 of the tapped delay element 20 is DATA IN' and results in the center of the half cell of the input data stream lining up with the rising edge of the actual recovered clock signal RECCLK', thereby minimizing the effects of jitter of the input signal.

The recovered clock and the input data can be applied to a latch (or other circuit element well known in the art) to reclock the input data. In the preferred embodiment of the present invention, the actual recovered clock RECCLK' is inputted to a clock input (c) of a D type flip-flop (F/F) 60, and the delayed input data signal DATA IN' is inputted to the D terminal of the D type F/F 60. The output (through a driver 62), DOUT, is a regenerated (or re-clocked) DATA IN signal "squared up" with significant amounts of distortion of the signal removed.

Figure 3:
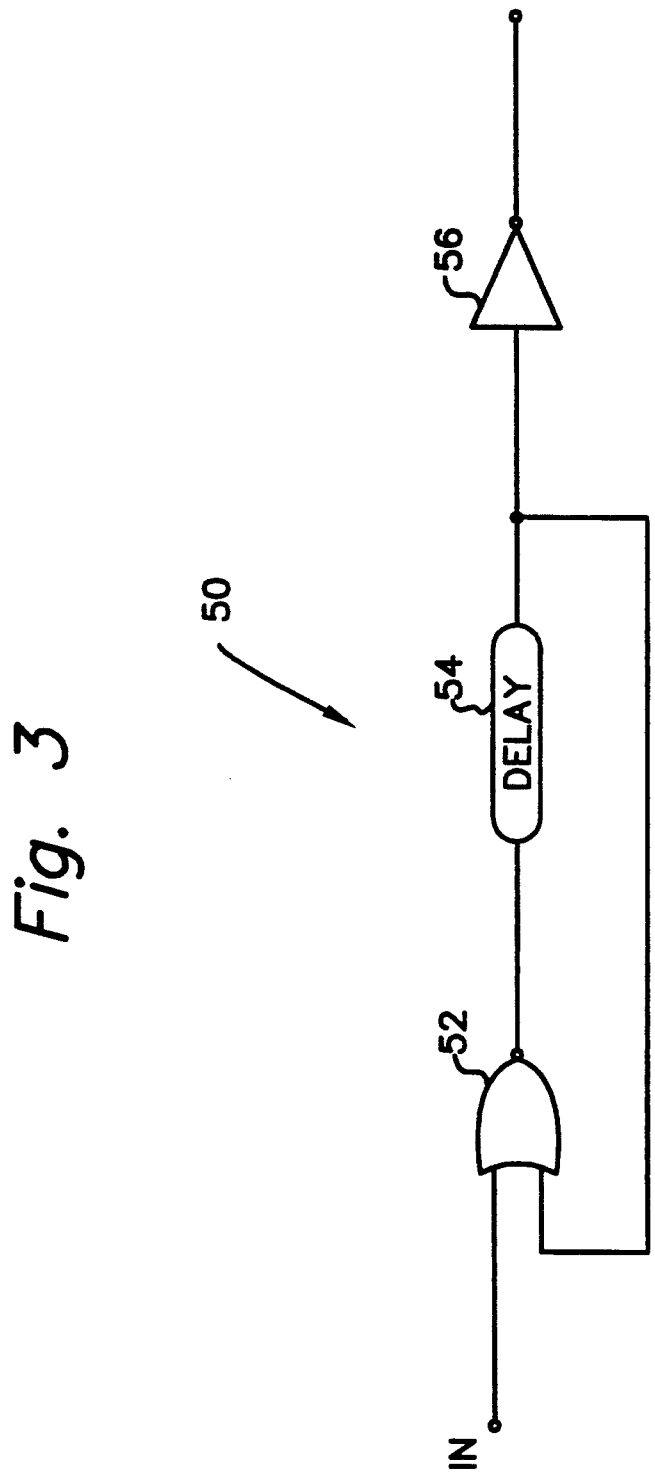
FIG. 3 shows a functional logic diagram of a delay-line oscillator used in the preferred embodiment of the present invention.

Internally, the delay line oscillator 50 functionally consists of a NOR gate 52, a delay line 54, and an inverter 56, as shown in FIG. 3. The operation of the delay line oscillator 50 is such that the output (OUT) remains at a high level as long as the input (IN) is high. The oscillator 50 begins to oscillate at its characteristic frequency approximately half a period after the input is taken low. The low going edges of the X4 signal cause a corresponding low going edge of the delay line oscillator output (OUT) half a period later, as shown in FIG. 2 (58). Also, there is a half period latency between the time the oscillator's input (IN) goes high and the output (OUT) goes high, as shown in FIG. 2 (59). The low going edges of the X4 signal cause synchronization of the clocking pulse developed by the delay line oscillator 50 to the input data stream. The delay line oscillator 50 of the preferred embodiment of the present invention is an $EC^2$ Co., TTLSWGM-10, available in the marketplace.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. An apparatus for eliminating jitter of an input data stream, said input data stream being a manchester encoded data stream which includes a data signal component and a clock signal component, said apparatus comprising:

a) clock extractor means, having an input terminal adapted to receive said input data stream, for extracting the clock signal component, the clock signal component extracted from the input data stream having periods where clock pulses are missing;

b) delay line oscillator means, operatively connected to said clock extractor means to receive the clock signal component, for providing the missing clock pulses to the clock signal component extracted from the input data stream, thereby generating a recovered clock signal; and c) latch means, having a first and second input terminal adapted to receive said input data stream and said recovered clock signal, respectively for reclocking the input data stream thereby removing the jitter and any distortion of said input data stream.

2. An apparatus for eliminating jitter of an input data stream, said input data stream being a manchester encoded data stream which includes a data signal component and a clock signal component, said apparatus comprising:
 a) clock extractor means, having an input terminal adapted to receive said input data stream, for extracting the clock signal component, the clock signal component extracted from the input data stream having periods where clock pulses are missing;
 b) delay line oscillator means, operatively connected to said clock extractor means to receive the clock signal component, for providing the missing clock pulses to the clock signal component extracted from the input data stream, thereby generating a recovered clock signal, said recovered clock signal being delayed a first predetermined time as a result of inherent delays in said delay line oscillator means and said clock extractor means; and
 c) latch means, having a first and second input terminal adapted to receive said input data stream and said recovered clock signal, respectively, the input data stream coupled by the first input terminal of said latch means being delayed by a second predetermined time, said first and second predetermined time being substantially equal, for reclocking the input data stream thereby removing a maximum amount of jitter in said input data stream and removing any distortion of said input data stream.

3. An apparatus for eliminating jitter of an input data stream according to claim 2, wherein said clock extractor means comprises:
 exclusive OR gate means, having a first and second input adapted to receive a first and second input signal, the first input signal being the input data stream and the second input signal being the input data stream delayed one quarter of a manchester cell, for exclusive ORing the first and second input signal to extract the clock signal component included in the input data stream, the clock signal extracted having missing clock pulses, the exclusive OR gate means outputting the clock signal extracted.

4. An apparatus for eliminating jitter of an input data stream according to claim 3, wherein said clock extractor means further comprises:
 a tapped delay element, having a first output which has a delay time for delaying the input data signal one quarter of a manchester cell which represents one hundred percent of the delay time of the tapped delay element, and further having a second output, the second output being a predetermined percentage of the delay time to obtain the input data stream having the second predetermined time delay.

5. An apparatus for eliminating jitter of an input data stream according to claim 4, wherein said latch means comprises:
 a D-type flip flop.

* * * * *